United States Patent [19]

Abu-Isa et al.

[11] Patent Number: 5,194,468

[45] Date of Patent: Mar. 16, 1993

[54] HIGH DENSITY POLYETHYLENE POLYBLENDS

[75] Inventors: Ismat A. Abu-Isa, Rochester Hills; Pamela M. Graham, Birmingham, both of Mich.

[73] Assignee: General Motors Corporation, Detroit, Mich.

[21] Appl. No.: 900,997

[22] Filed: Jun. 19, 1992

[51] Int. Cl.$^5$ ............................................. C08K 5/526
[52] U.S. Cl. ..................................... 524/128; 524/151
[58] Field of Search .................... 525/173, 444, 176; 524/128, 151

[56] References Cited

U.S. PATENT DOCUMENTS

| | | | |
|---|---|---|---|
| 2,860,115 | 11/1958 | Hecker et al. | 524/151 |
| 3,375,304 | 3/1968 | Larrison | 524/128 |
| 3,937,757 | 2/1976 | Sedyll et al. | 525/173 |
| 4,212,791 | 7/1980 | Avery et al. | 260/40 |
| 4,259,458 | 3/1981 | Robeson | 525/68 |
| 4,327,198 | 4/1982 | Weemes et al. | 525/177 |
| 4,346,195 | 8/1982 | Hornbaker et al. | 525/176 |
| 4,397,986 | 8/1983 | Hornbaker | 525/64 |
| 4,424,254 | 1/1984 | Hedrick et al. | 428/215 |
| 4,460,729 | 7/1984 | Books | 525/177 |
| 4,588,764 | 5/1986 | Lee | 524/128 |
| 4,845,169 | 7/1989 | Abu-Isa et al. | 525/444 |

Primary Examiner—Veronica P. Hoke
Attorney, Agent, or Firm—Randy W. Tung

[57] ABSTRACT

A thermoplastic polyblend of high density polyethylene, polyethylene terephthalate, a polyester elastomer, and a mixture of two aromatic phosphites. The polyblend has greatly improved impact strength and low gasoline permeation properties.

6 Claims, 1 Drawing Sheet

HIGH DENSITY POLYETHYLENE POLYBLENDS

FIELD OF THE INVENTION

The present invention generally relates to a thermoplastic polyblend of high density polyethylene and, more particularly, is concerned with a thermoplastic polyblend of high density polyethylene, polyethylene terephthalate, a polyester elastomer, and a mixture of two aromatic phosphites.

BACKGROUND OF THE INVENTION

High density polyethylene (HDPE) is a low-cost, high performance thermoplastic material. In its crystalline state, HDPE has superior physical properties and good thermal stability. Being a thermoplastic, it can be economically processed by an injection molding machine.

HDPE is presently the plastic material of choice for making automobile fuel tanks. It has excellent tensile and impact properties at temperatures as low as $-50°$ C. and at temperatures as high as 70° C. which is the temperature range normally experienced by a fuel tank in service. Since HDPE has low cost, it is competitive with steel which is presently used for making most automobile fuel tanks.

One drawback of HDPE that needs improvement in its continued use for plastic fuel tanks, is the permeation of HDPE to automotive fuels. At present, this drawback is being compensated by treating the interior surfaces of the HDPE tank with chlorinating or sulfonating agents. These treatments are effective against gasoline permeation but are less effective in gasoline/alcohol blends. Another problem is that the chemical used in the fluorinating or sulfonating treatments are toxic and corrosive and pose some potential health hazards.

One other approach to improve the permeability of HDPE is to blend it with highly crystalline polar materials. One such candidate is polyethylene terephthalate (PET). Polyethylene terephthalate is a low-cost material and an excellent barrier to non-polar fuel components. However, it has low impact strength and a low melt viscosity which are inadequate for fuel tank applications. Furthermore, blends of high density polyethylene and polyethylene terephthalates are highly incompatible due to their large differences in polarity and melt viscosities which result in materials having poor physical properties as compared to either component of the blend. A method for compatibilizing the blend is therefore needed before the blend can be effectively used in making automobile fuel tanks. Some work was performed to compatibilize high density polyethylene/polyethylene terephthalate blends by using styrene-butadiene-styrene block copolymers or acrylic acid grafted polypropylene with very limited success. Only minor improvements in tensile strength, flexural strength and impact strengths were noted.

It is, therefore, an object of the present invention to provide a polyblend of high density polyethylene/polyethylene terephthalate having improved impact properties.

It is another object of the present invention to provide a polyblend of high density polyethylene/polyethylene terephthalate having low permeation properties to gasoline fuels such that the polyblend can be used in molding automobile fuel tanks.

It is a further object of the present invention to provide an moldable, high impact strength polyblend of high density polyethylene/polyethylene terephthalate for use in automobile fuel tanks applications.

It is yet another object of the present invention to provide a low cost, moldable polyblend of high density polyethylene/polyethylene terephthalate having superior impact properties and low permeation properties to gasoline fuel such that it can be used in molding automobile fuel tanks.

SUMMARY OF THE INVENTION

In accordance with the preferred embodiment of this invention, a thermoplastic high density polyethylene/polyethylene terephthalate polyblend having superior impact and low gasoline permeation properties can be formulated This polyblend composition can be readily blow molded into automobile fuel tanks in a low-cost manufacturing process.

We have developed a unique and novel polyblend of high density polyethylene/polyethylene terephthalate by first adding a third component of a polyester elastomer. The uniqueness of the blend is then accomplished by the incorporation of a small concentration of a fourth component, namely, a mixture of two aromatic phosphites of poly(dipropylene glycol) phenyl phosphite (DHOP) and tris nonyl phenyl phosphite (TNPP). The polyblend obtained has a finer and more homogeneous dispersion of polyethylene terephthalate in high density polyethylene and thus producing a polyblend having superior impact strength and low permeation to gasoline fuels.

The four major components of our novel composition are mechanically mixed together with small fractions of other additives in a Brabender mixer. Blending of larger quantities was performed by using a plastic extruder.

DETAILED DESCRIPTION OF THE PREFERRED EMBODIMENT

According to our novel invention, a thermoplastic polyblend having superior impact properties and low gasoline fuel permeation can be formulated by the following four major components: (a) a high density polyethylene, and (b) a thermoplastic polyester, preferably polyethylene terephthalate, (c) a polyester elastomer of a block copolymer of n-butyl terephthalate and ethylene oxide/propylene oxide, and (d) at least one of two aromatic phosphites of poly(dipropylene glycol) phenyl phosphite and tris nonyl phenyl phosphite. The proportions of each component may be varied within the range of from 50-90 weight percent high density polyethylene, from 10-30 weight percent polyethylene terephthalate, from 5-30 weight percent polyester elastomer, and from 1-5 percent of at least one of the aromatic phosphites.

In accordance with another embodiment of this invention, the thermoplastic polyblend may further include chopped glass fibers or other convenient fillers as a reinforcing agents.

It is to be noted that the word blend and polyblend may be used interchangeably throughout this specification. They both mean the same blend.

The high density polyethylene used in the present invention is commercially available from Phillips 66 under the tradename of Marlex ® HXM 50100. It has a density of 0.95 g/cc and a melt index of 10 g/10 min. It has a relatively high melt strength necessary for extrusion blow molding of large parts such as automobile fuel tanks. The polyethylene terephthalate used in the present invention is a condensation polymer produced from dimethyl terephthalate and ethylene glycol. It was obtained from Eastman Kodak Company under the tradename of Kodak PAK ® PET 7352. It has a bulk density of 1.4 g/cm² and an intrinsic viscosity of 0.76 dL/g. The number average molecular weight of the PET is 24,000 and the weight average molecular weight is 48,000. It has a crystallinity of approximately 50% and a much lower melt strength than HDPE. It is normally used for injection molding and for oriented injection blow molded soft drink bottles. The polyester elastomer used is a block copolymer of n-butyl terephthalate hard segment and ethylene oxide/propylene oxide soft segment marketed by the E. I. DuPont Company under the tradename of Hytrel ® 4074. Other polyester elastomers such as that of a block copolymer of tetramethylene glycol soft segment and n-butyl terephthalate hard segment (DuPont Hytrel ® 5525) and a block copolymer of a butyl acrylate/methyl methacrylate polymer (Rohm and Haas Acryloid ® KM 330) may work equally well in our polyblends.

To further improve the processing characteristics and the compatibility between the components, a reactive processing aid which is at least one of two aromatic phosphites of poly(dipropylene glycol) phenyl phosphite (DHOP) and tris nonyl phenyl phosphite (TNPP) are used. Both of these two liquid phosphites are supplied by the General Electric Company. All materials are used as received.

Blending of large quantities (larger than 1 Kg) of our thermoplastic polyblend was conducted by using a Brabender plasticorder extruder at a screw speed of 75 rpm and a barrel temperature of 271° C. The barrel of the extruder has an L/D ratio of 25:1. The compression ratio of the extruder screw was 4:1. All ingredients of the blends were first dry blended in a suitable container. The screw speed of the extruder was maintained at 75 rpm. Four temperature zones in the extruder barrel were adjusted and controlled for each extrusion. The rear zone of the extruder was controlled at a constant temperature whose value was selected for easy feeding of the blends into the extruder screw. The temperature range used for the various blends was between 232° C. to 270° C. The middle and the front zones of the extruder were controlled at 271° C. and the nozzle temperature was maintained at between 232° C. to 270° C. for all the polyblends. The extrudates were air cooled, chopped and stored in a desiccator until they were used.

The difficulty of compatibilizing high density polyethylene and polyethylene terephthalate can be readily explained in terms of the large differences in the properties of the two polymers as shown in Table 1. The two polymers exhibit large differences in melting point, glass transition temperature, melt flow, and solubility parameter. The incompatibility of these two materials is shown in Table 2 for a polyblend of 70 weight percent polyethylene terephthalate and 30 weight percent high density polyethylene. The 70/30 PET/HDPE polyblend has lower values of elongation, yield stress, and reverse notched impact strength than either of the two components. It has intermediate values for peak stress and notched Izod strength, but even in this case the values are closer to those of PET rather than those of the major component HDPE. This data clearly indicates the incompatibility of the blends of these two basic polymers.

TABLE 1

Properties Comparison of High Density Polyethylene and Polyethylene Terephthalate

|  | HDPE | PET |
|---|---|---|
| Glass Transition Temperature | −120° C. | 81° C. |
| Melt Temperature | 120° C. | 255° C. |
| Hildebrand Solubility Parameter | 17 MPA^0.5 | 20.6 MPa^0.5 |
| Melt Flow Index | 0.03 g/10 min @ 190° C. | 1.2 g/10 min @ melt |

TABLE 2

Tensile and Impact Properties of HDPE, PET and HDPE/PET Blend

| Material | Elongation (%) | Yield Stress (MPa) | Peak Stress (MPa) | Notched Izod Impact (J/m) | Reverse Notched Impact (J/m) |
|---|---|---|---|---|---|
| HDPE | 44 | 18 | 28 | 292 | All hinged break |
| PET | 35 | 75 | 21 | 33 | 590 |
| 70/30 HDPE PET | 9 | 11 | 24 | 42 | 171 |

The addition of a thermoplastic elastomer, a block copolymer of n-butyl terephthalate hard segment and ethylene oxide/propylene oxide soft segment to the polyblend did not appreciably improve the properties. This is shown in Table 3. In fact, the only improvement is in the reverse notched impact strength. It was therefore concluded that the addition of the thermoplastic elastomer to the polyblend did not enhance the compatibility of the polyblend.

TABLE 3

Tensile and Impact Properties of HDPE/PET Blend With and Without Hytrel ® 4074

| Material | Elongation (%) | Yield Stress (MPa) | Peak Stress (MPa) | Notched Izod Impact (J/m) | Reverse Notched Impact (J/m) |
|---|---|---|---|---|---|
| 70/30 PE/PET | 9 | 11 | 24 | 42 | 171 |
| 70/25/5 PE/PET/ Hytrel ® 4074 | 9 | 8 | 17 | 39 | 189 |

In a previous patent issued to Abu-Isa et al, U.S. Pat. No. 4,845,169, it was shown that the addition of an aromatic phosphite to a polyethylene terephthalate/polyester elastomer blend resulted in compatibilization and improved properties. Abu-Isa et al discovered that the phosphite acts as a transesterification catalyst and improves the compatibility of polyethylene terephthalate/polyester elastomer blends by forcing interactions between the two polymers. Since high density polyethylene does not contain ester groups, the addition of the organic phosphite to a blend consisting mainly of high density polyethylene should not have any significant effects. Therefore, it was completely unexpected when phosphite was added to the present polyblends, it resulted in significant improvements in the properties of the high density polyethylene/polyester terephthalate blends. The improvements are even more significant in blends containing high density polyethylene, polyethylene terephthalate, and polyester elastomer.

Table 4 shows a series of polyblends that were tried out of which most containing the four components. It is to be noted that even though a mixture of the two aromatic phosphites having a ratio of 1 part of DHOP to 3 parts of TNPP is shown in Table 4, we have also used DHOP/TNPP at the ratio between 0:5 to 5:0 while producing equally satisfactory results. We have found that pure DHOP, high volatility and reactivity of DHOP render the process control a little more difficult. On the other hand, pure TNPP produces polyblends having slower rate of reactivity. A mixture of the two seems to produce a more desirable polyblend. Table 5 shows that all tensile and impact properties are improved by the addition of the aromatic phosphites. The most significant increases are observed in the case of the impact properties of the high density polyethylene/polyethylene terephthalate/polyester elastomer blends.

TABLE 4

PE/PET Blend Formulations
Blend ID

|  | A | B | C | D | E | F | G |
|---|---|---|---|---|---|---|---|
| HDPE | 70 | 70 | 70 | 70 | 60 | 60 | 80 |
| PET | 30 | 25 | 25 | 30 | 40 | 40 | 20 |
| HYTREL ® 4074 | — | 5 | 5 | — | — | — | — |
| DHOP | — | — | .75 | .75 | .75 | — | .75 |
| TNPP | — | — | 2.25 | 2.25 | 2.25 | — | 2.25 |

|  | H | I | J | K | L | M | N |
|---|---|---|---|---|---|---|---|
| HDPE | 80 | 70 | 70 | 70 | 70 | 70 | 70 |
| PET | 20 | — | — | 15 | 15 | 20 | 20 |
| HYTREL ® 4074 | — | 30 | 30 | 15 | 15 | 10 | 10 |
| DHOP | — | .75 | — | .75 | — | .75 | — |
| TNPP | — | 2.25 | — | 2.25 | — | 2.25 | — |

All values indicate Parts by Weight.

TABLE 5

Tensile and Impact Properties of HDPE/PET/Hytrel ® 4074 Blends With and Without Phosphite

| Material | Elongation (%) | Yield Stress (MPa) | Peak Stress (MPa) | Notched Izod Impact (J/m) | Reverse Notched Impact (J/m) |
|---|---|---|---|---|---|
| 70/30 PE/PET | 9 | 11 | 24 | 42 | 171 |
| 70/30 PE/PET + Phosphite* | — | — | — | 51 | 425 |
| 70/25/5 PE/PET/Hytrel ® 4074 | 9 | 8 | 17 | 38 | 189 |
| 70/25/5 PE/PET/Hytrel ® 4074 + Phosphite* | 35 | 10 | 21 | 245 | 495 |

*Phosphite concentration is 0.75 phr of poly(dipropylene glycol)phenyl Phosphite and 2.25 phr tris nonyl phenyl phosphite.

Figure 1:
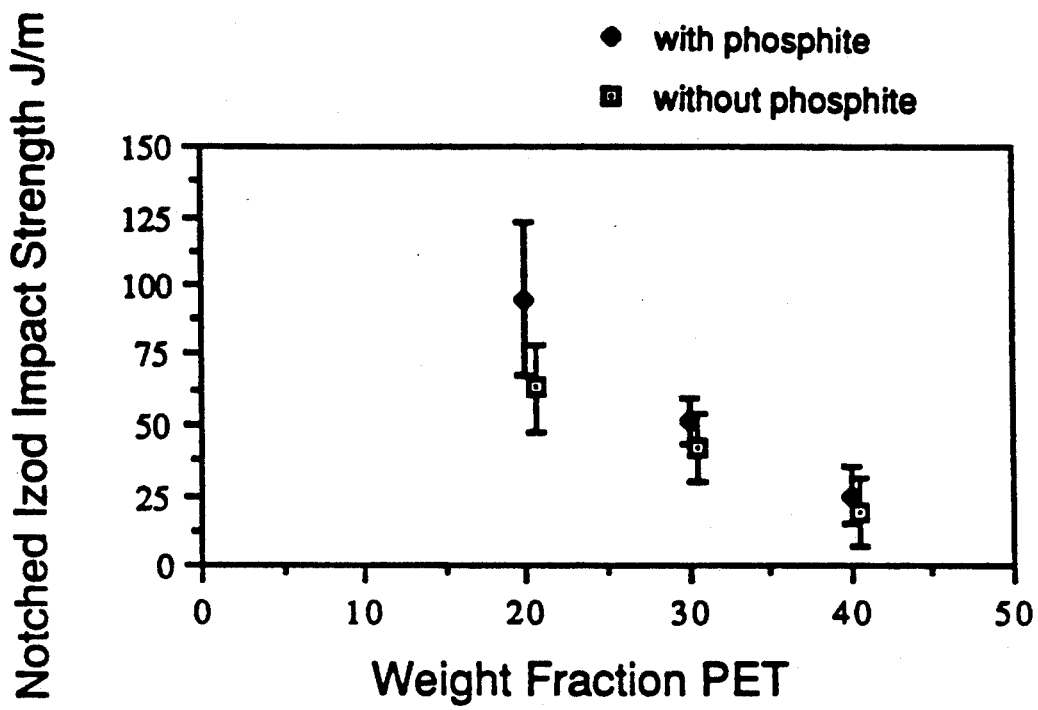
FIGS. 1 and 2 show that the improvements in impact strength are observed for many blend ratios other than those shown in Table 5.
Figure 2:
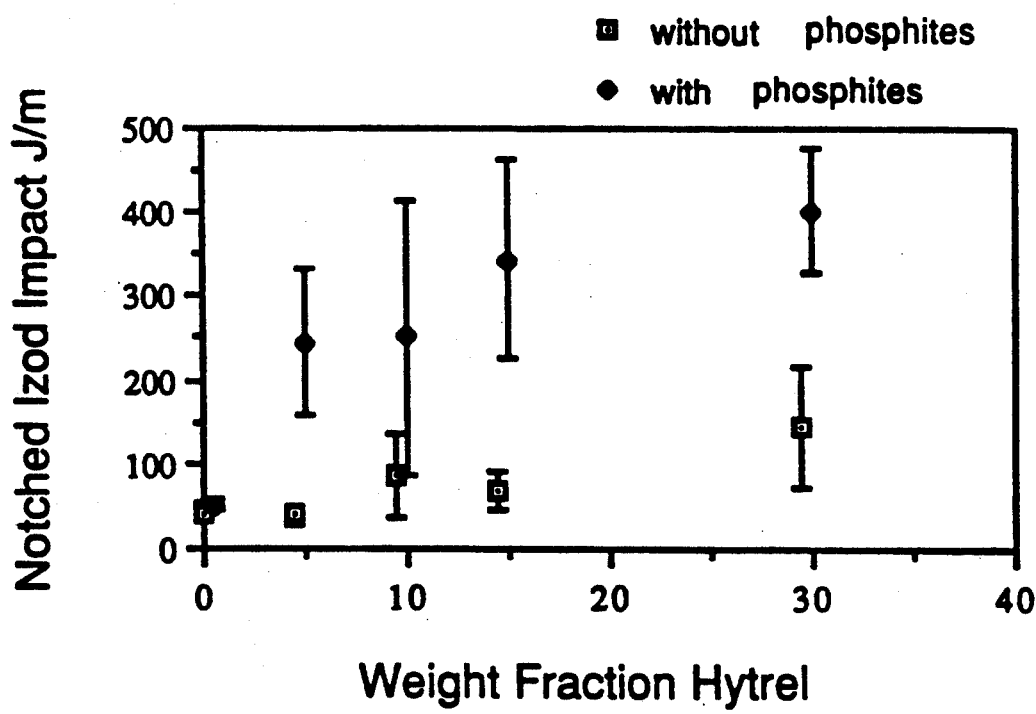

FIG. 1 compares three blends (Blend A, Blend D, and Blend H in Table 4) with varied high density polyethylene/polyethylene terephthalate ratios and no polyester elastomers and the same blends with added phosphites. It is clearly shown as the weight percent of polyethylene terephthalate is increased, the impact strength decreases. The impact strength of each blend increased with the addition of phosphites but the gain was not large. Compare this with FIG. 2 which shows the effect of the polyester elastomer component on high density polyethylene/polyethylene terephthalate blends. In contrast to those shown in FIG. 1, these blends (Blend B, Blend C, Blends I-N in Table 4) contain a constant 70 weight percent of high density polyethylene with the indicated percentage of polyester elastomer and the balance as polyethylene terephthalate. Adding the polyester elastomer increases the impact strength but combining phosphite and polyester elastomer has a much larger effect. It is, therefore, concluded that added aromatic phosphites increases the impact strength of high density polyethylene/polyethylene terephthalate blends but more dramatically they enhance the effectiveness of the polyester elastomer in increasing the impact strength. Since polyethylene does not contain ester groups and therefore should not be affected by the phosphite transesterification catalyst, the cause for the parent compatibilization of the blend and the improvement in properties is attributed to the changes in morphology of the blend by the addition of the phosphite. Scanning electron micrographs of cryogenically fractured surfaces of a high density polyethylene/polyester terephthalate blend and a high density polyethylene/polyethylene terephthalate/polyester elastomer blend with phosphite showed dramatic differences in its morphology. The size of the polyethylene terephthalate/polyester elastomer domains in the high density polyethylene matrix are much finer when phosphite was added to the polyblend.

While our invention has been described in terms of several specific embodiments thereof, other forms could be readily adopted by one skilled in the rt to achieve the same results.

The embodiments of the invention in which an exclusive property or privilege is claimed are defined as follows:

1. A high impact strength thermoplastic polyblend of high density polyethylene and polyethylene terephthalate comprising:
   (a) 50 to 90 percent by weight of total polyblend of a high density polyethylene,
   (b) 10 to 30 percent by weight of total polyblend of a polyethylene terephthalate,
   (c) 5 to 30 percent by weight of total polyblend of a thermoplastic elastomer, and
   (d) 1 to 5 percent by weight of total polyblend of at least one of poly(dipropylene glycol) phenyl phosphite and tris nonyl phenyl phosphite,
   whereby said phosphites improve the compatibility between said high density polyethylene and said polyethylene terephthalate and thus producing a polyblend having improved impact strength and reduced gasoline permeability.

2. A high impact strength thermoplastic polyblend of high density polyethylene and polyethylene terephthalate comprising:
   (a) 50 to 90 percent by weight of total polyblend of a high density polyethylene,
   (b) 10 to 30 percent by weight of total polyblend of a polyethylene terephthalate,
   (c) 5 to 30 percent by weight of total polyblend of a thermoplastic elastomer block copolymer consisting of n-butyl terephthalate and ethylene oxide/propylene oxide, and
   (d) 1 to 5 percent by weight of total polyblend of at least one of poly(dipropylene glycol) phenyl phosphite and tris nonyl phenyl phosphite in a weight ratio between 0:5 to 5:0, whereby said phosphites improve the compatibility between said high density polyethylene and said polyethylene terephthalate and thus producing a polyblend having improved impact strength and reduced gasoline permeability.

3. A high impact strength thermoplastic polyblend of high density polyethylene and polyethylene terephthalate comprising:
(a) 50 to 90 percent by weight of total polyblend of a high density polyethylene,
(b) 10 to 30 percent by weight of total polyblend of a polyethylene terephthalate,
(c) 5 to 30 percent by weight of total polyblend of at least one thermoplastic elastomer selected from the group comprising a block copolymer of n-butyl terephthalate hard segment and ethylene oxide/propylene oxide soft segment, a block copolymer of tetramethylene glycol soft segment and n-butyl terephthalate hard segment, and a block copolymer of a butyl acrylate/methyl methacrylate polymer,
(d) 1 to 5 percent by weight of total polyblend of a mixture of poly(dipropylene glycol) phenyl phosphite and tris nonyl phenyl phosphite in a weight ratio between 0:5 to 5:0,
whereby said phosphites improve the compatibility between said high density polyethylene and said polyethylene terephthalate and thus producing a polyblend having improved impact strength and reduced gasoline permeability.

4. A polyblend composition as claimed in claim 2 wherein the weight ratio of poly(dipropylene glycol) phenyl phosphite to tris nonyl phenyl phosphite being 1:3.

5. A polyblend composition as claimed in claim 2 wherein the weight ratio of poly(dipropylene glycol) phenyl phosphite to tris nonyl phenyl phosphite being 1:1.

6. A polyblend composition as claimed in claim 3 wherein the weight percent of high density polyethylene being 60 to 80; the weight percent of polyethylene terephthalate being 15 to 25; the weight percent of said at least one thermoplastic elastomer being 5 to 15; and the weight percent of said mixture of poly(dipropylene glycol) phenyl phosphite and tris nonyl phenyl phosphite being 2 to 4.

* * * * *